United States Patent [19]

Palmgren

[11] Patent Number: 4,535,804
[45] Date of Patent: Aug. 20, 1985

[54] CONDUIT-BREAK VALVE FOR A PRESSURE CONDUIT OR HOSE WITH A SURROUNDING PROTECTIVE CONDUIT OR HOSE

[75] Inventor: Karl S. Palmgren, Luleå, Sweden
[73] Assignee: Regioninvest I Norr AB, Luleå, Sweden
[21] Appl. No.: 537,410
[22] PCT Filed: Jan. 25, 1983
[86] PCT No.: PCT/SE83/00020
§ 371 Date: Sep. 15, 1983
§ 102(e) Date: Sep. 15, 1983
[87] PCT Pub. No.: WO83/02988
PCT Pub. Date: Sep. 1, 1983
[30] Foreign Application Priority Data
Feb. 25, 1982 [SE] Sweden .................. 8201177
[51] Int. Cl.³ .................. F16K 17/24; F17D 5/04
[52] U.S. Cl. .................. 137/458; 137/488; 73/40.5 R
[58] Field of Search .......... 137/488, 461, 458; 73/40.5 R

[56] References Cited
U.S. PATENT DOCUMENTS
4,338,812 7/1982 Lindgren .................. 73/40.5 R FOREIGN PATENT DOCUMENTS
2928529 1/1981 Fed. Rep. of Germany .

WO82/00185 1/1982 PCT Int'l Appl. .

Primary Examiner—Alan Cohan
Attorney, Agent, or Firm—Merchant, Gould, Smith, Edell, Welter & Schmidt

[57] ABSTRACT

A conduit-break valve for a double conduit (10, 11) has a pressure relief device (28) with a pilot controlled check valve (41, 42) with a control piston (37) which is actuated by the pressure in the space (26) between the double conduits (10, 11) and opens the check valve (41, 42) when a limit value determined by the spring (43) thereof is exceeded. The check valve (41, 42) thereby relieves the pressure in a fluid lock which is formed by a piston and cylinder mechanism (17, 18) the cylinder (18) of which is normally kept closed by the check valve (41, 42) and the piston (17) of which is connected to the main valve member (16) of the main valve, whereby said valve member will be moved to closed position by the action of a pressure spring (19) when the check valve (41, 42) is opened. A reduction of the pressure in the space (26) between the double conduits (10, 11) results in the spring (19) moving the piston (17) and the main valve member (16) connected thereto towards closed position, which gives rise to a fluid flow through a one-way restrictor (51-53) which is thereby opened and propagates the pressure caused by the spring (19) to the control piston (37), whereby the pilot controlled check valve (41, 42) relieves the pressure in the fluid lock formed by the piston and cylinder mechanism (17, 18).

5 Claims, 6 Drawing Figures

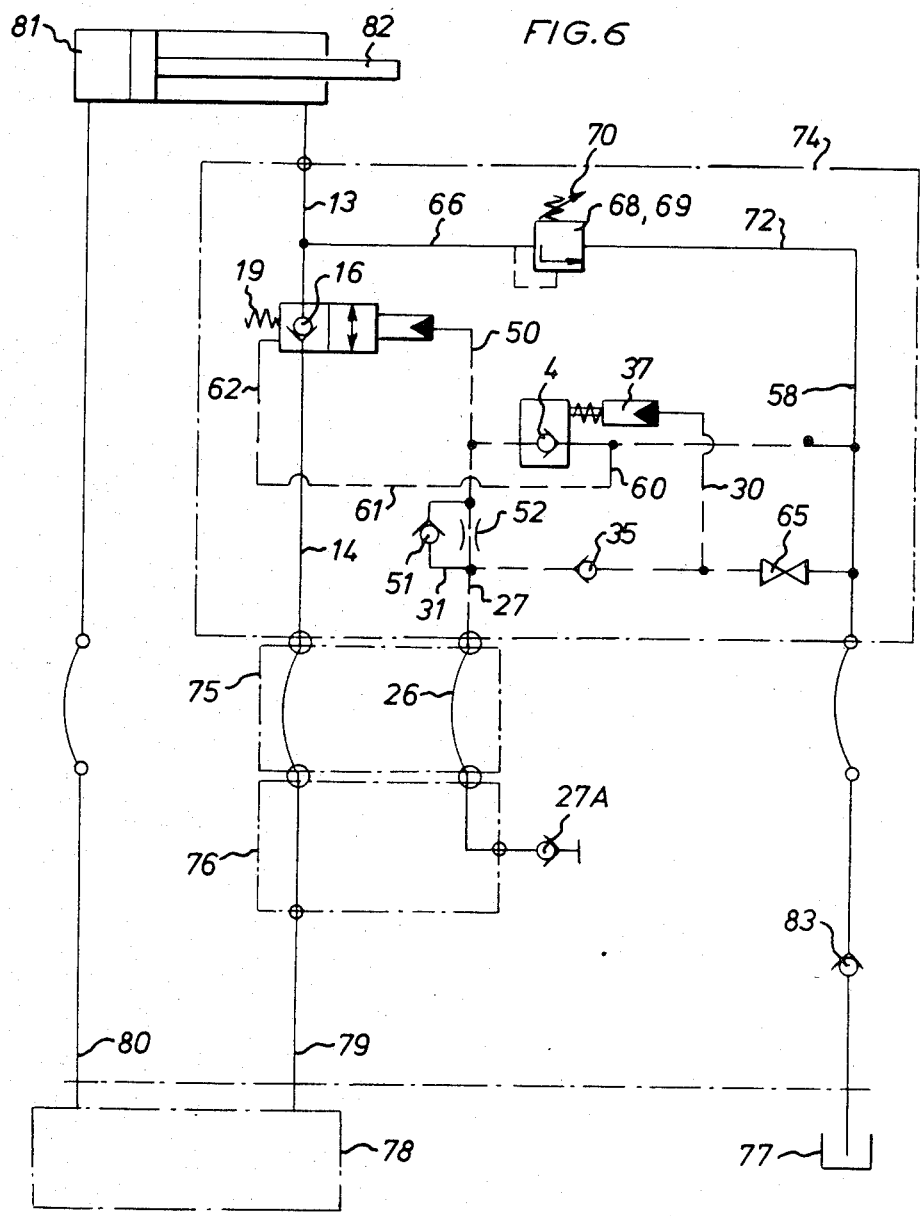

CONDUIT-BREAK VALVE FOR A PRESSURE CONDUIT OR HOSE WITH A SURROUNDING PROTECTIVE CONDUIT OR HOSE

In many situations one has need of being able to shut off a pressure conduit or hose at conduit-breaks. This may be the case for instance with regard to pressure oil conduits. One has therefore developed various types of conduit-break valves. As examples of some such valves mention may be made of the published European patent application 79850114.4 (Publ. No. EP-Al-0 013 264) and Swedish Patent 7702588-0 (Publ. No. SE-B-412 946). Common to these prior art valve mechanisms is that in their valve housings they have a throughflow passage and a main slide gate which is movable between an open position and a closed position preventing flow through the throughflow passage, and which is adapted to be actuated by the pressure medium in said space to be kept in the open position against the action of a loading device which is arranged yieldingly to urge the slide gate towards the closed position and, if the pressure of the pressure medium in said space sinks, to move the slide gate to its closed position. The valve according to said published European patent specification further has a pressure relief device which is connected to said space and adapted to relieve the pressure therein if the pressure rises over a predetermined upper limit value. These prior art conduit-break valves, especially the last-mentioned one, function in a satisfactory manner but suffer from certain drawbacks, i.e. that pressure medium, when the upper limit value pressure is exceeded, may get lost and escape to the surroundings at the release of the pressure relief device.

One object of the present invention is to overcome this and other drawbacks and to provide a conduit-break valve which permits a more exact adjustment of the upper limit value pressure and besides makes it possible to avoid pressure medium spillage to the surroundings.

This and other objects of the invention are realized if a conduit-break valve of the afore-mentioned type is designed to operate at a higher pressure in the pressure conduit or hose than that prevailing in the space between the two conduits or hoses and if the conduit-break valve according to the invention is characterised by the features that the pressure relief device has a pilot controlled check valve with a control piston adapted to be actuated by the pressure in said space and, when the upper limit value is exceeded, to open the check valve member yieldingly loaded in accordance with said limit value, thus relieving the pressure in said space. By this design of the conduit-break valve a leakage of the pressure conduit or hose will thus result in an increase of the pressure in the surrounding protective conduit or hose, said pressure increase displacing the control piston and thereby opening the check valve and quickly relieving the pressure in the space between the two conduits or hoses so that the valve member of the main valve by the action of its yieldable load closes the throughflow passage through the conduit-break valve.

In a particularly advantageous embodiment of the invention the pressure relief device is designed as a fluid lock in the form of a piston and cylinder mechanism the piston of which is connected or made in an integral piece with the valve member or body of the main valve and the cylinder chamber of which is normally kept closed by the check valve member of the pilot controlled check valve. With this design of the pressure relief device it is possible to permit the piston of the piston and cylinder mechanism to be urged against an abutment by the action of the pressure in said space and to be kept engaged with this abutment in normal operation when no leakage has occurred on the inner or outer conduit or hose.

When the pressure relief device is designed as a fluid lock it is particularly advantageous according to the present invention to have the cylinder chamber and the space between the two conduits or hoses interconnected via a one-way restrictor the valve member of which is yieldingly loaded towards closed position and adapted to be opened when the pressure in the space between the two conduits or hoses drops. This embodiment of the invention thus permits a quicker closing of the valve at breaks of the protective conduit or hose than what would otherwise be realized.

In a further development of the invention the control piston is slidably disposed in a control piston cylinder the inlet of which is connected to the space between the two conduits or hoses via a check valve. By this arrangement the advantage will be gained that the control piston and the control piston cylinder operate as a fluid lock so that the main valve member of the conduit-break valve can safely be held in closed position until the damaged conduits or hoses have been repaired and the control piston cylinder has been emptied in a separate operation to cause the control piston to return to its original position in which the check valve member of the pressure relief device has been engaged with its valve seat.

In a still further development of the invention the valve is provided with a shock check valve which is connected to the throughflow passage of the valve housing and adapted to relieve the pressure therein at sudden pressure increases beyond an upper limit value determined by the shock check valve. This embodiment of the invention is particularly advantageous in for instance hydraulic systems for excavators or like machines, when a sudden stoppage of the excavating bucket may give rise to heave pressure peaks which might damage the system.

The invention will be described more in detail below with reference to accompanying drawings which illustrate an embodiment of the invention. In the drawings:

FIG. 6 shows a diagram of the hydraulic connections of the conduit break-valve illustrated in FIGS. 1-5.

Figure 1:
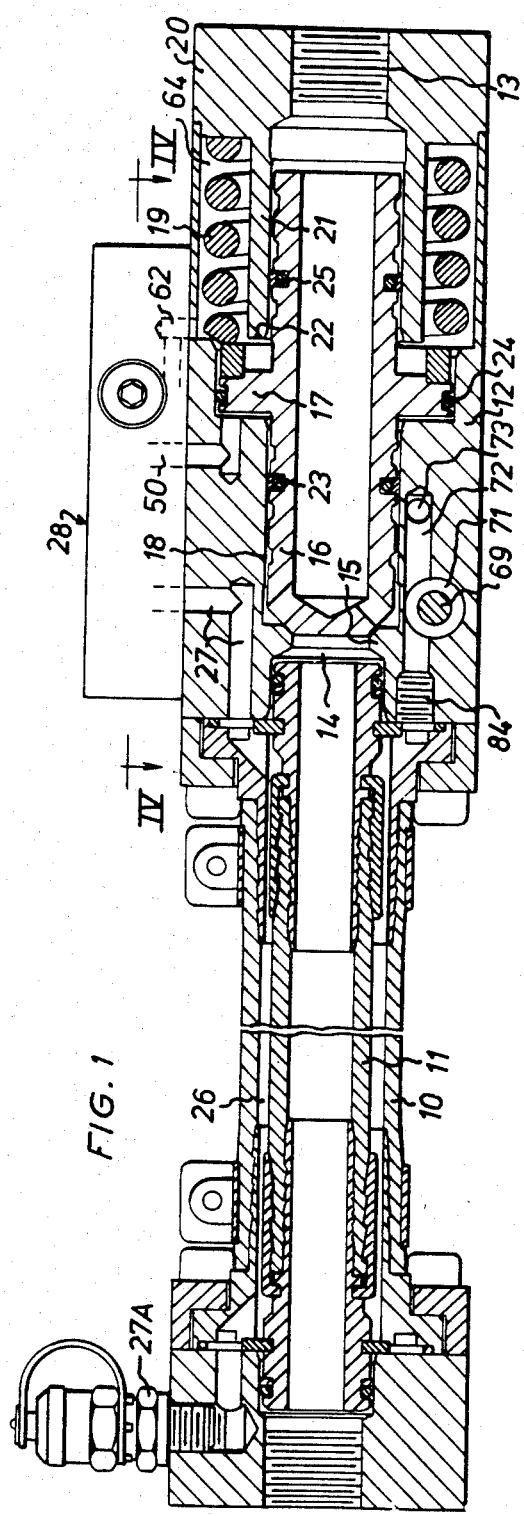
FIG. 1 is a longitudinal section of a conduit-break valve according to the invention, the valve being shown in closed position.
Figure 2:
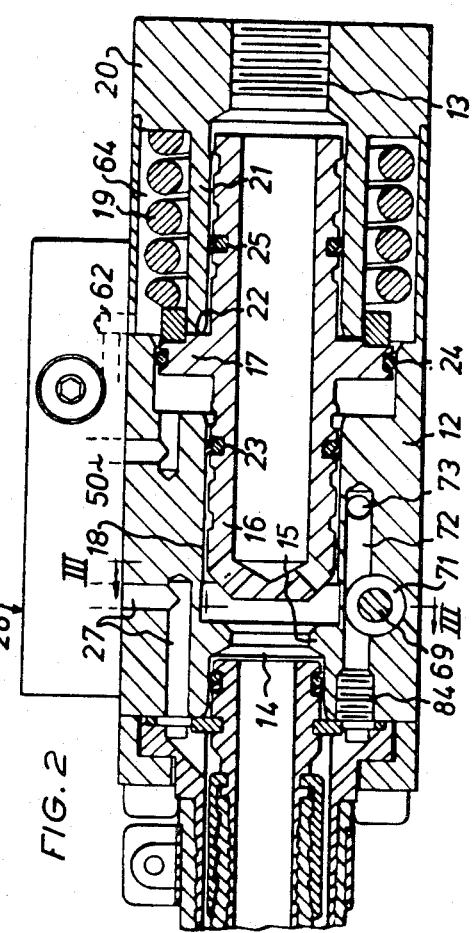
FIG. 2 shows the same longitudinal section, but with the valve in open position.

The conduit-break valve shown in FIGS. 1 and 2 is meant to be connected to a double conduit which comprises an inner pressure conduit or hose 10 and an outer protective conduit or hose 11. In the embodiment illustrated, these components are hoses with connecting nipples for their connection to a valve housing 12. The valve housing 12 has an outlet 13 and an inlet 14 and an inner valve seat 15. The connecting nipple of the pressure hose protrudes into the inlet 14 and provides a seal against the wall thereof. The valve housing contains a valve member or body 16 which is united with a piston 17 slidable in a widened portion 18 of the outlet 13 to serve together with said portion as a fluid lock. The valve member 16 and the piston 17 are yieldingly urged towards the seat 15 by a strong pressure spring 19 which is kept clamped by means of spring holder 20. Said spring holder 20 has a cylindrical portion 21 with a stop face 22 against which the piston 17 bears when the conduit-break valve is open. The valve member 16 and the piston 17 are sealed with regard to the valve housing 12 and the cylindrical portion 21 by means of sealing rings 23, 24, 25.

As is apparent from FIG. 1, there is provided between the conduits 10 and 11 a space 26 which is normally kept filled with a pressure medium at a predetermined pressure. A filling valve 27A serves to supply said pressure medium and in the embodiment shown the valve 27A is disposed at the other ends of the conduits or hoses 10, 11. The space 26 is connected to a passage 27 in the valve housing 12 to communicate via this passage with a pressure relief device 28 which is attached to the valve housing 12.

Figure 4:
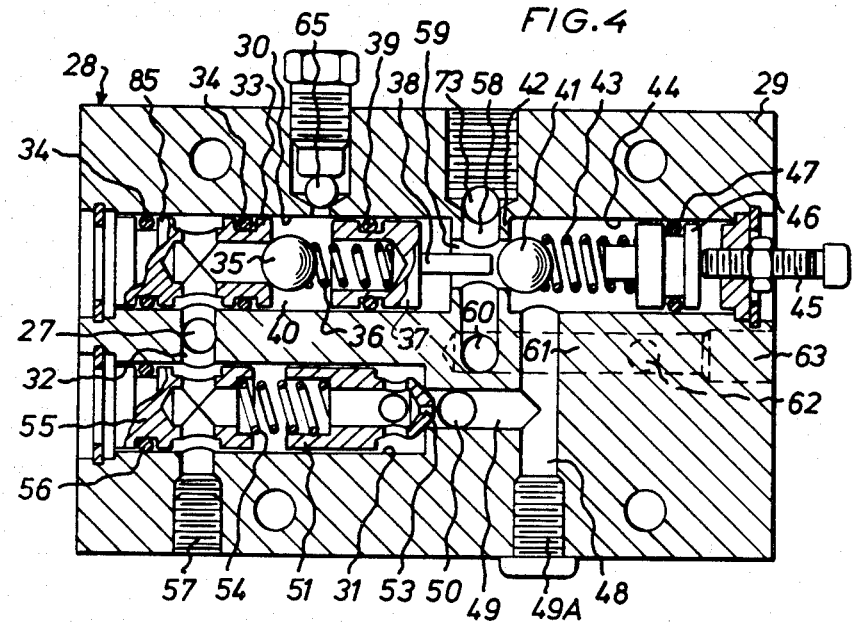
FIGS. 4 and 5 are sections on line IV—IV in FIG. 1 and illustrate a pressure relief device being part of the conduit-break valve in two setting positions.
Figure 5:
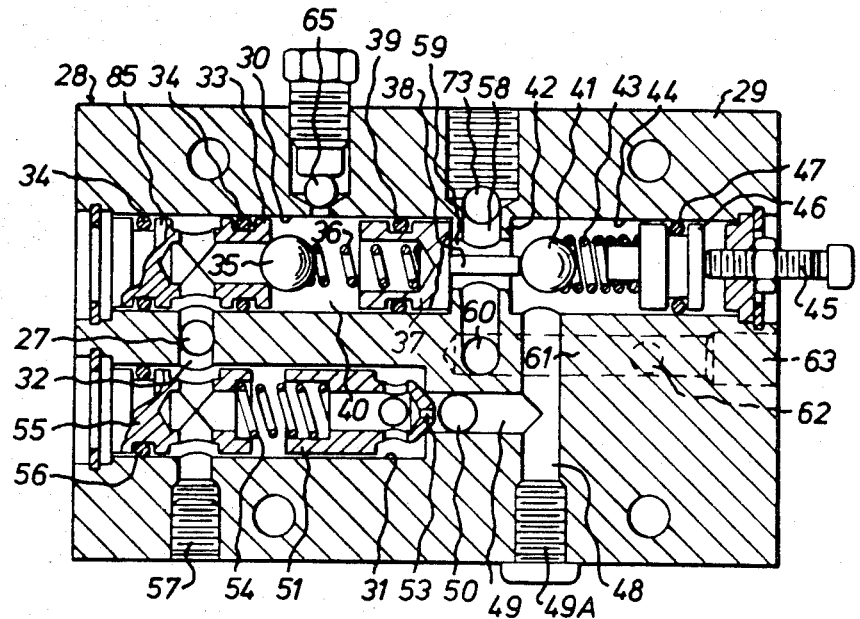

The pressure relief device 28 is shown more in detail in FIGS. 4 and 5. The device comprises a valve housing 29 with a number of passages. Thus there are two wide bores 30, 31 which are interconnected by means of a transverse bore 32. The passage 27 of the valve housing 12 opens into said transverse bore 32. The bore 30 houses a body 85 which comprises a valve seat 33 and seals 34 for establishing a seal with regard to the bore 30. A check valve member 35 is urged against the valve seat 33 by means of a pressure spring 36 which bears against a control piston 37. The control piston 37 is slidable in the bore 30 and has a projecting rod 38. The control piston 37 is sealed by means of a seal 39 with regard to the bore 30 to define a cylindrical space 40 for the control piston 37 between the valve seat 33 and said piston.

The rod 38 of the control piston 37 bears against a check valve member 41 which is urged against a valve seat 42 by a spring 43 in a bore 44. The force at which the check valve member 41 is urged against its valve seat 42 can be regulated by setting the degree of compression of the spring 43 with the aid of an adjusting device 45 which acts against the spring holder 46 of the spring, said holder 46 being sealed by means of a sealing ring 47 with regard to the bore 44.

The bore 44 is connected to a passage 48 which opens at the outer side of the pressure relief device, but is closed by means of plug 49A. Via a transverse passage 49 the passage 48 is connected to the bore 31 and has a smaller diameter than said bore. The passage 49 is besides connected to a passage 50 which continues down into the valve housing 12 and is connected to the cylindrical space defined between the piston 17, the cylinder 18 and the two sealing rings, 23, 24.

A one-way restrictor valve member, i.e. a perforated valve member 51, is inserted in the bore 30. Said valve member normally bears against the valve seat 52 formed by the mouth of the passage 49. The valve member 51 has a bore 53 which serves as a throttling means to permit a slow pressure equalization between the two sides of the restrictor.

The restrictor valve member 51 is kept urged against its valve seat 52 by a spring 54 which is supported by a spring holder body 55 which is inserted in the bore 31 and sealed with respect to it by means of a seal 56.

As is apparent from FIG. 4, the space 26 is thus connected to the two bores 30, 31 via the passage 27 and the transverse bore 32 which is closed by means of a plug 57.

The pressure relief device 28 also has a passage 58 which is connected to the bore 30 via a hole 59 of larger diameter than that of the rod 38. Besides the passage 58 is connected via a passage 60 to a passage 61 and via the latter to a passage 62. The passage 61 is closed by means of a plug 63. As is apparent from FIGS. 1 and 2, the passage 62 opens into a spring housing 64 which is defined by the spring holder 20, the valve housing 12 and the piston 17.

Further, a drain valve 65 is disposed in the pressure relief device 28. This valve permits draining of the space 40 of the bore 30 between the valve seat 33 and the control piston 37.

Figure 3:
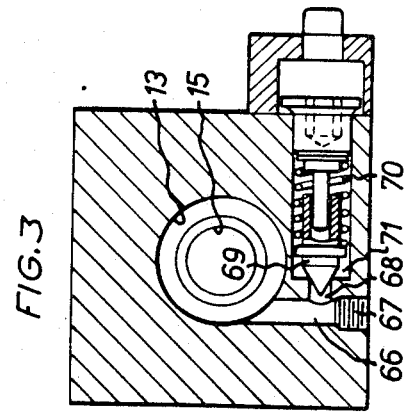
FIG. 3 is a section on line III—III in FIG. 2.

As is apparent from FIG. 3, the conduit-break valve according to the invention also has a shock valve which is designed as a check valve. Thus, a passage 66 is connected to the throughflow 13, 14 of the main valve and closed by means of a plug 67. From the passage 66 there extends a hole 68 forming a valve seat for a needle valve 69 which is yieldingly urged against its valve seat by an adjustable spring mechanism 70. The valve member 69 and the spring mechanism 70 extend through a bore 71. As is apparent from FIG. 3, this bore 71 is connected to a passage 72 in the valve housing 12. Said passage in turn is connected to a passage 73 and closed by means of plug 84. The passage 73 extends through the valve housing 12 and opens into the passage 58 of the pressure relief device 28.

The passage 58 of the pressure relief device 28 is connected via a check valve 83 to a return conduit leading to a supply tank.

The diagram of the hydraulic connections of the device described in the foregoing is shown in FIG. 6, in which the portion indicated by the dash and dot lines 74 is constituted by the components mounted in and associated with the valve housing 12 and the pressure relief device 28. The portion indicated by dash and dot lines 75 comprises the conduits or hoses 10, 11. The area indicated by the dash and dot lines 76 consists of the coupling housing at the opposite ends of the conduits or hoses. In the hydraulic connection diagram the same reference numerals have been employed as in the other Figures. As is apparent from the connection diagram, the outlet passage 58 from the pressure relief device 28 is connected to a tank 77. In the embodiment illustrated, the conduit-break valve is utilized for an excavator or mechanical loader the main operating valve of which is designated 78. The pressure outlet side 79 of said valve is connected to the inlet 14 of the conduit-break valve, while the return conduit 8 of the main operating valve is connected to one end of a bucket arm cylinder 81 the other end of which is connected to the outlet 13 of the conduit-break valve. The bucket arm cylinder houses a piston 82.

The device operates as follows:

When the conduit-break valve according to the invention is put in use, one first increases the pressure in the space 26 between the two conduits or hoses 10, 11 by filling it via the filling or charging valve 27A. At this charging operation the pressure medium which shall be of the same type as the pressure medium in the pressure conduit 11, will flow through the space 26 and the passages 27 into the bore 31 and via the hole 53 of the check valve 51 into the passage 50 so that the piston 17 is moved into engagement with the stop face 22. During part of said charging operation, venting may take place through the venting valve or plug 49. After said charging operation, the valve occupies its open position, as shown in FIG. 2.

Should a break of the pressure conduit 10 occur and the high pressure in the interior of said conduit (say 225 or 400 Bar) leak over into the space 26, where the pressure normally may be say 10 Bar, the valve member 35 will be unseated so that the pressure can act on the rear of the control piston 37. As a result, the control piston 37 will by means of its rod 38 unseat the valve member 41 against the action of the pressure spring 43. Said pressure spring 43 may for instance be set at a limit value of 20 Bar. This implies that as soon as the pressure in the space 26 between the two conduit exceeds 20 Bar, the valve member 41 will be raised from its seat 42. As soon as this occurs there is established an open connection from the cylinder 18 via passages 50, 49, 48 and 44 to the outlet passage 58 which is connected to the draining tank 77. There now arises an instantaneous relief of the pressure in the cylinder 18 so that the piston 17 will rapidly move to the left as viewed in FIG. 2 and be urged by the spring 19 against its seat, as is shown in FIG. 1. The result thus is an instantaneous shut-off of the flow through the conduit-break valve. As soon as the pressure is relieved via the outlet passage 58 the valve member 35 will again be urged against its seat 33 by the spring 36, whereby the pressure fluid amount prevailing in the space 40 will be trapped. The spring piston 37 will thus serve as a hydraulic lock and prevent a renewed opening of the main valve until the space 40 has been drained with the aid of the valve 65.

Should the outer conduit or hose 10 break while the inner conduit or hose 11 is still intact, the spring 19 will successively urge the piston 17 to the left as viewed in FIG. 2 so that the valve is finally set in its closed position shown in FIG. 1.

This closing operation can be accelerated if one employs the one-way restrictor 51-53 according to the further development of the invention. The function of this valve is as follows:

Should a pressure drop occur in the space 26 the spring 19 will give rise to a flow of pressure medium through the passages 50, 49 to the one-way restrictor and open it so that the pressure caused by the spring 19 in the pressure medium will be propagated via the passages 31, 32 to the passage 30, whereby the valve member 35 will be unseated and the control piston 37 with its rod 38 will raise the valve member 42 from its seat. This will lead to an instantaneous relief of the pressure in the cylinder 18 so that the main valve member 16 will immediately be brought to bear against its seat 15.

The connecting passages 60-62 between the spring housing 64 and the passage 58 serve to reinforce the action of the control piston 37 when a break of the outer conduit or hose 10 but not of the inner conduit or hose 11 occurs. As the spring housing 20 is closed and limited at one end by the movable piston 17, a displacement of the piston to the left as viewed in FIG. 2 will give rise to a pressure below atmospheric in the space 64. This pressure below atmospheric is propagated via the passages 60-62 and the passage 58 as well as the hole 59 to the front face of the control piston 37 which will thus be sucked to the right as viewed in FIG. 4 simultaneously as it is subjected to a pushing action via the check valve 35.

As mentioned in the foregoing, the conduit-break valve according to the invention contains a shock valve which actually is but a relief valve which relieves the pressure in the main conduit 11 at sudden pressure peaks. This relief occurs as the needle valve 69 has been raised from its seat and leaves the way open to the passage 58 from where drainage takes place to the draining tank 77.

The conduit-break valve described above is only one embodiment of a valve according to the invention. Many variations are thus conceivable within the scope of the appended claims.

I claim:

1. A conduit-break valve for a pressure conduit or hose (11) with a surrounding protective conduit or hose (10) and with a space (26) for containing pressure medium between said conduits or hoses, comprising in its valve housing (12) a throughflow passage (13, 14) and a main valve member (16) which is movable between an open position and a closed position preventing flow through the throughflow passage (13, 14) and is adapted to be actuated by the pressure medium in said space (26) to be kept in the open position against the action of a loading device (19) which is adapted yieldingly to urge the main valve member (16) towards the closed position and, if the pressure of the pressure medium in said space (26) drops, to move the main valve member (16) to its closed position, and a pressure relief device (28) which is connected to said space (26) and adapted to relieve the pressure therein if the pressure exceeds a predetermined upper limit value, characterised in that the pressure relief device (28) has a pilot controlled check valve (41, 42) with a control piston (37) which is adapted to be actuated by the pressure in said space (26) and, when the upper limit value is exceeded, to open the check valve member (42) of the check valve (41, 42) which is yieldingly loaded in accordance with said limit value, thus relieving the pressure in said space (26).

2. A valve as claimed in claim 1, characterised in that the pressure relief device (28) is designed as a fluid lock in the form of a piston and cylinder mechanism (17, 18) the piston (17) of which is connected or made in an integral piece with the main valve member (16) and the cylinder chamber (18) of which is normally kept closed by the check valve member (42) of the pilot controlled check valve (41, 42).

3. A valve as claimed in claim 2, characterised in that the cylinder chamber (18) and said space (26) are interconnected via a one way restrictor (51-53) the valve member (51) of which is yieldingly urged towards closed position and adapted to be opened when the pressure in said space (26) drops.

4. A valve as claimed in claim 1, characterised in that the control piston (37) is movably disposed in a control piston cylinder (30, 40) the inlet (33) of which is connected to said space (26) via a check valve (33, 35).

5. A valve as claimed in claim 1, characterised in that a shock check valve (68, 69) is connected to the throughflow passage (13, 14) of the valve housing (12) and adapted to relieve the pressure therein at sudden pressure increases beyond an upper limit value determined by the shock check valve.

* * * * *